US012764843B2

(12) United States Patent
Yang et al.

(10) Patent No.: US 12,764,843 B2
(45) Date of Patent: Oct. 13, 2026

(54) DRIVING CIRCUIT AND DRIVING METHOD THEREFOR, AND VEHICLE LAMP

(71) Applicants: Chengdu BOE Optoelectronics Technology Co., Ltd., Chengdu (CN); BOE Technology Group Co., Ltd., Beijing (CN)

(72) Inventors: Jie Yang, Beijing (CN); Zhicai Xu, Beijing (CN); Shaoning Liu, Beijing (CN); Bowen Xiao, Beijing (CN); Shangnan Jin, Beijing (CN); Qi Huang, Beijing (CN); Chang Liu, Beijing (CN); Yihao Zhao, Beijing (CN); Peng Chen, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 18/859,596

(22) PCT Filed: Jan. 2, 2024

(86) PCT No.: PCT/CN2024/070154
§ 371 (c)(1),
(2) Date: Oct. 24, 2024

(87) PCT Pub. No.: WO2024/146519
PCT Pub. Date: Jul. 11, 2024

(65) Prior Publication Data

US 2025/0193984 A1 Jun. 12, 2025

(30) Foreign Application Priority Data

Jan. 3, 2023 (CN) ......................... 202310004619.9

(51) Int. Cl.
*H05B 45/60* (2022.01)
*H05B 45/18* (2020.01)

(52) U.S. Cl.
CPC ............. *H05B 45/60* (2020.01); *H05B 45/18* (2020.01)

(58) Field of Classification Search
CPC .. G09G 3/32; G09G 2330/021; G09G 3/3233; G09G 3/3426
See application file for complete search history.

(56) References Cited

U.S. PATENT DOCUMENTS

2009/0309510 A1 12/2009 Liu
2022/0336561 A1* 10/2022 Cha ...................... G09G 3/3241
2022/0343851 A1* 10/2022 Kuang ................. G09G 3/3233

FOREIGN PATENT DOCUMENTS

CN 1703731 A * 11/2005
CN 202887673 U 4/2013
(Continued)

OTHER PUBLICATIONS

International Search Report mailed on Apr. 1, 2024, received for PCT Application No. PCT/CN2024/070154, filed on Jan. 2, 2024, 4 pages including English Translation.
(Continued)

*Primary Examiner* — Van N Chow
(74) *Attorney, Agent, or Firm* — XSENSUS LLP

(57) ABSTRACT

A driving circuit is configured to drive a light-emitting unit to emit light, and the driving circuit includes: a voltage regulation circuit, configured to regulate a driving voltage of the light-emitting unit according to a voltage regulation signal; and a processing chip, configured to provide the voltage regulation signal to the voltage regulation circuit to reduce a difference between a reference current and a driving current of the light-emitting unit under a turned-on state.

18 Claims, 3 Drawing Sheets

(56) References Cited

FOREIGN PATENT DOCUMENTS

| | | | |
|---|---|---|---|
| CN | 103310753 | A | 9/2013 |
| CN | 103672538 | A | 3/2014 |
| CN | 106793253 | A | 5/2017 |
| CN | 111198470 | A | 5/2020 |
| CN | 114745828 | A | 7/2022 |
| CN | 115884468 | A | 3/2023 |
| TW | 200906225 | A | 2/2009 |

OTHER PUBLICATIONS

Written Opinion mailed on Apr. 1, 2024, received for PCT Application No. PCT/CN2024/070154, filed on Jan. 2, 2024, 7 pages including English Translation.

The First Office Action mailed Jun. 28, 2025, in Chinese Application No. 202310004619.9, 28 pages including English translation.

* cited by examiner

DRIVING CIRCUIT AND DRIVING METHOD THEREFOR, AND VEHICLE LAMP

CROSS-REFERENCE TO RELATED APPLICATIONS

The present application is a U.S. national stage of International Application No. PCT/CN2024/070154, filed on Jan. 2, 2024, and claims priority to Chinese Patent Application No. 202310004619.9 entitled "Drive circuit and driving method therefor, and vehicle lamp" filed on Jan. 3, 2023, and the entire contents of both of which are incorporated herein by reference as a part of the present application.

TECHNICAL FIELD

The present disclosure relates to the field of display technology, and in particular, to a driving circuit and a driving method thereof, and a vehicle lamp.

BACKGROUND

The vehicle lamp generally includes a light-emitting unit and a driving chip (IC), and the driving chip IC is configured to drive the light-emitting unit to emit light. In the related art, the light-emitting unit generally adopts an organic light emitting diode (OLED) device, the light-emitting brightness of the OLED device is positively correlated with the driving current of the OLED device, and the internal resistance of the OLED device changes greatly with the change of the temperature. In order to keep the brightness of the vehicle lamp consistent at different temperatures, the driving chip IC generally adopts a constant current driving IC. However, the cost of the constant current driving IC is relatively higher.

It should be noted that the information disclosed in the above background part is only used to enhance the understanding of the background of the present disclosure, and therefore may include information that does not constitute related art known to those of ordinary skill in the art.

SUMMARY

According to an aspect of the present disclosure, there is provided a driving circuit, where the driving circuit is configured to drive a light-emitting unit to emit light, and the driving circuit includes a voltage regulation circuit and a processing chip. The voltage regulation circuit is configured to regulate a driving voltage of the light-emitting unit according to a voltage regulation signal. The processing chip is configured to provide the voltage regulation signal to the voltage regulation circuit to reduce a difference between a reference current and a driving current of the light-emitting unit under a turned-on state.

In some embodiments of the present disclosure, the driving circuit is configured to drive a plurality of light-emitting units to emit light, and the processing chip is further configured to output serial data for controlling the plurality of light-emitting units to be turned off or turned on. The driving circuit further includes a serial-to-parallel chip, and the serial-to-parallel chip includes an input end and a plurality of output ends, wherein the input end of the serial-to-parallel chip is configured to receive the serial data, and the serial-to-parallel chip is configured to convert the serial data into parallel data and output the parallel data through the plurality of output ends of the serial-to-parallel chip; where, an output end of the serial-to-parallel chip and the light-emitting unit are correspondingly provided, and the parallel data output at the output end of the serial-to-parallel chip is used for controlling a corresponding light-emitting unit to be turned off or turned on.

In some embodiments of the present disclosure, the output end of the serial-to-parallel chip is configured to provide a driving voltage to a light-emitting unit corresponding to the output end of the serial-to-parallel chip, the voltage regulation circuit is configured to provide a power supply voltage to the serial-to-parallel chip, and the power supply voltage of the serial-to-parallel chip is positively correlated with a voltage of the output end of the serial-to-parallel chip within a voltage upper limit range output at the output end of the serial-to-parallel chip.

In some embodiments of the present disclosure, the driving circuit further includes a plurality of switching units; a switching unit and the light-emitting unit are correspondingly provided; the switching unit and the light-emitting unit corresponding to the switching unit are provided in series; where, the output end of the serial-to-parallel chip is provided corresponding to the switching unit, the output end of the serial-to-parallel chip is connected to a control end of the corresponding switching unit, and the parallel data output at the output end of the serial-to-parallel chip is used for controlling a current loop in which the light-emitting unit is located to be turned off or turned on; and the voltage regulation circuit is configured to provide a driving voltage to the light-emitting unit.

In some embodiments of the present disclosure, the driving circuit further includes a first resistor, and the first resistor and the light-emitting unit are provided in series; and the processing chip is configured to provide the voltage regulation signal according to a voltage difference between two ends of the first resistor.

In some embodiments of the present disclosure, the driving circuit further includes a differential amplification circuit; two input ends of the differential amplification circuit are respectively connected to the two ends of the first resistor, and an output end of the differential amplification circuit is connected to the processing chip; and, the processing chip is configured to provide the voltage regulation signal according to a voltage of the output end of the differential amplification circuit.

In some embodiments of the present disclosure, the processing chip is configured to provide the voltage regulation signal by using a preset algorithm; the preset algorithm includes comparing the voltage of the output end of the differential amplification circuit with a reference voltage under the turned-on state of the light-emitting unit; when the voltage of the output end of the differential amplification circuit is greater than the reference voltage, the voltage regulation signal is used to reduce the driving voltage of the light-emitting unit; and when the voltage of the output end of the differential amplification circuit is less than the reference voltage, the voltage regulation signal is used to increase the driving voltage of the light-emitting unit.

In some embodiments of the present disclosure, the processing chip is configured to regulate the driving voltage of the light-emitting unit according to a preset step size through the voltage regulation signal, and a step size of each regulation of the driving voltage of the light-emitting unit is the same.

In some embodiments of the present disclosure, the processing chip is configured to regulate the driving voltage of the light-emitting unit according to a preset step size through the voltage regulation signal, and the smaller a difference between the voltage of the output end of the differential amplification circuit and the reference voltage is, the smaller the step size for regulating the driving voltage of the light-emitting unit is.

In some embodiments of the present disclosure, the processing chip is configured to provide the voltage regulation signal by using a preset algorithm; the preset algorithm includes obtaining a total voltage required across two sides of the light-emitting unit and the first resistor according to a formula of $Vd=Vc*R1*I/V1$ under the turned-on state of the light-emitting unit, where R1 is a resistance value of the first resistor, V1 is a voltage difference between two ends of the first resistor, Vc is a total voltage across two sides of the light-emitting unit and the first resistor before the driving voltage of the light-emitting unit is regulated, Vd is the total voltage required across two sides of the light-emitting unit and the first resistor, and I is the reference current; and, the processing chip is configured to obtain a corresponding voltage regulation signal according to the total voltage required across two sides of the light-emitting unit and the first resistor.

In some embodiments of the present disclosure, the driving circuit further includes a plurality of first resistors, a first resistor and the light-emitting unit are correspondingly provided, and the first resistor and the light-emitting unit corresponding to the first resistor are provided in series; and, the processing chip is configured to provide the voltage regulation signal according to voltage differences between two ends of the plurality of first resistors.

In some embodiments of the present disclosure, the processing chip is configured to provide the voltage regulation signal according to an average value of the voltage differences between two ends of the plurality of first resistors; or, the processing chip is configured to provide the voltage regulation signal according to a median value of the voltage differences between two ends of the plurality of first resistors.

In some embodiments of the present disclosure, a temperature drift coefficient of the first resistor is less than or equal to 5000 ppm.

In some embodiments of the present disclosure, a resistance value of the first resistor at 25° C. is R1, a resistance of the light-emitting unit under the turned-on state is RL, and R1 is less than or equal to ⅕ RL.

In some embodiments of the present disclosure, the differential amplification circuit includes an operational amplifier, a second resistor, a third resistor, a fourth resistor, a fifth resistor and a sixth resistor; an output end of the operational amplifier is connected to the processing chip; the second resistor is connected between a first end of the first resistor and a positive input end of the operational amplifier; the third resistor is connected between a second end of the first resistor and an inverting input end of the operational amplifier; the fourth resistor is connected between the positive input end of the operational amplifier and a ground end; the fifth resistor is connected between the inverting input end of the operational amplifier and the output end of the operational amplifier; and the sixth resistor is connected between the ground end and the output end of the operational amplifier.

In some embodiments of the present disclosure, the driving circuit further includes a temperature sensor, and the temperature sensor is configured to detect a temperature of the light-emitting unit; and, the processing chip is configured to provide the voltage regulation signal according to the temperature of the light-emitting unit.

In some embodiments of the present disclosure, the light-emitting unit is an OLED light-emitting unit.

According to an aspect of the present disclosure, there is provided a driving method for a driving circuit, where the driving method is used for driving the above-mentioned driving circuit, and the driving method includes:

- providing the voltage regulation signal to the voltage regulation circuit by using the processing chip; and
- regulating the driving voltage of the light-emitting unit according to the voltage regulation signal by using the voltage regulation circuit to reduce the difference between the reference current and the driving current of the light-emitting unit under the turned-on state.

According to an aspect of the present disclosure, there is provided a vehicle lamp including the above-mentioned driving circuit.

It is to be understood that both the foregoing general description and the following detailed description are exemplary and explanatory only and are not restrictive of the present disclosure.

BRIEF DESCRIPTION OF THE DRAWINGS

The accompanying drawings here, which are incorporated in and constitute a part of the description, illustrate embodiments consistent with the disclosure and together with the description serve to explain the principles of the disclosure. Obviously, the drawings in the following description are some embodiments of the present disclosure, and for those of ordinary skill in the art, other drawings can also be obtained from these drawings without creative efforts.

DETAILED DESCRIPTION

Figure 1:
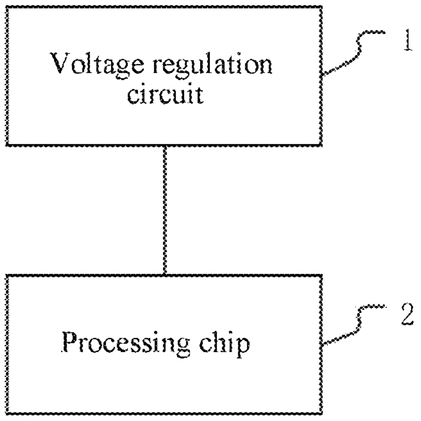
FIG. 1 is a schematic structural diagram of a driving circuit according to some embodiments of the present disclosure.

Example embodiments will now be described more fully with reference to the accompanying drawings. Example embodiments, however, can be implemented in various forms and should not be construed as limited to the embodiments set forth herein; by contrast, these embodiments are provided so that the present disclosure will be thorough and complete, and will fully convey the concept of example embodiments to those skilled in the art. The same reference numerals in the drawings denote the same or similar structures, and thus their detailed descriptions will be omitted.

Although relative terms such as “upper” and “lower” are used in the specification to describe the relative relationship of one component o to another component shown in the drawings, these terms are used in this specification for convenience only, for example, according to the example direction described in the accompanying drawings. It should be understood that if the device shown in the drawings is flipped upside down, the component described as "upper" will become the component described as "lower". Other relative terms, such as "high", "low", "top", "bottom", "left", "right", or the like also have similar meanings. When a structure is "on" another structure, it may mean that a structure is integrally formed on another structure, or that a structure is "directly" disposed on another structure, or that a structure is "indirectly" disposed on another structure through another structure.

The terms "a", "an" and "the" are used to indicate the presence of one or more elements/components/or the like; the terms "including" and "having" are used to indicate the meaning of an open inclusion and refer to that there may be additional elements/components/or the like in addition to the listed elements/components/or the like.

According to some embodiments of the present disclosure, there is firstly provided a driving circuit. As shown in FIG. 1, it is a schematic structural diagram of a driving circuit according to some embodiments of the present disclosure. The driving circuit is configured to drive a light-emitting unit to emit light, and the driving circuit includes a voltage regulation circuit 1 and a processing chip 2. The voltage regulation circuit 1 is configured to regulate a driving voltage of the light-emitting unit according to a voltage regulation signal, and the processing chip 2 is configured to provide the voltage regulation signal to the voltage regulation circuit 1 to reduce a difference between a reference current and a driving current of the light-emitting unit under a turned-on state. The light-emitting unit may be an OLED light-emitting unit.

In some embodiments, the voltage regulation circuit 1 can be controlled by using the voltage regulation signal to output constant voltage signals of different magnitudes. The processing chip 2 can regulate the output voltage of the voltage regulation circuit 1 through the voltage regulation signal in real time, and the output voltage of the voltage regulation circuit 1 can be used to control the driving voltage of the light-emitting unit. Therefore, the driving current of the light-emitting unit can be stabilized at a reference current through regulating the driving voltage of the light-emitting unit by the driving circuit when the resistance of the light-emitting unit changes. The reference current is a preset value, and the preset value may be set according to a brightness requirement when the light-emitting unit is turned on. For example, when the temperature of the light-emitting unit decreases and its resistance increases, the driving current of the light-emitting unit is reduced to be less than the reference current, and at this time, the difference between the actual driving current of the light-emitting unit and the reference current can be reduced by increasing the driving voltage of the light-emitting unit.

Figure 2:
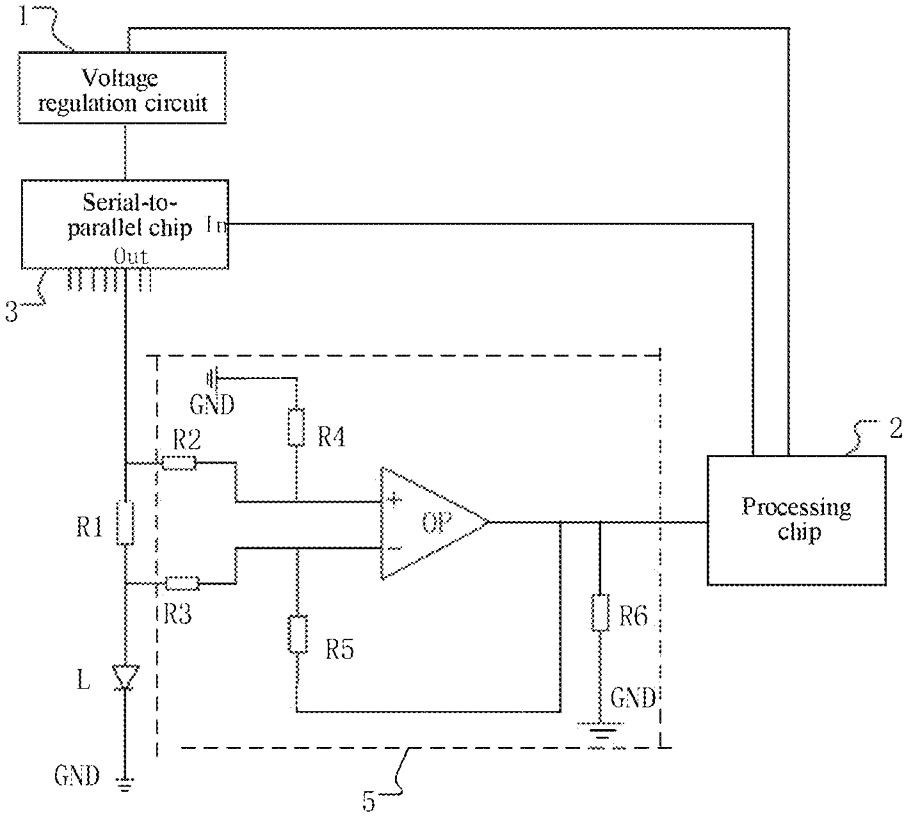
FIG. 2 is a schematic structural diagram of a driving circuit according to some embodiments of the present disclosure.

In some embodiments, the driving circuit may be configured to drive a plurality of light-emitting units to emit light, and the processing chip 2 may be further configured to output serial data for controlling the plurality of light-emitting units to be turned off or turned on. As shown in FIG. 2, it is a schematic structural diagram of a driving circuit according some embodiments of the present disclosure. The driving circuit further includes a serial-to-parallel chip 3, and the serial-to-parallel chip 3 includes an input end In and a plurality of output ends Out. The input end In of the serial-to-parallel chip is configured to receive the serial data. The serial-to-parallel chip 3 is configured to convert the serial data into parallel data, and output the parallel data through the plurality of output ends Out of the serial-to-parallel chip 3. For example, the serial-to-parallel chip 3 may include eight output ends Out. The input end In may receive the serial data 11110000. The eight output ends Out may respectively output 1, 1, 1, 1, 0, 0, 0, 0 simultaneously, where the output end Out and the light-emitting unit L are provided correspondingly. The output end Out of the serial-to-parallel chip 3 is configured to provide a driving voltage to the light-emitting unit L corresponding to the output end Out. The voltage regulation circuit 1 is configured to provide a power supply voltage to the serial-to-parallel chip 3. Within the upper limit range of the voltage output at the output end of the serial-to-parallel chip 3, the power supply voltage of the serial-to-parallel chip 3 is positively correlated with the voltage of the output end of the serial-to-parallel chip 3. For example, the serial-to-parallel chip 3 may be selected as a model 74HC595. The power supply voltage of the serial-to-parallel chip 3 is the same as the voltage of the output end of the serial-to-parallel chip 3. The voltage regulation circuit 1 may adopt a chip of a model IML8873, and the voltage regulation circuit 1 may control the driving voltage of the light-emitting unit L.

As shown in FIG. 2, the driving circuit may further include a first resistor R1. The first resistor R1 and a light-emitting unit L are provided in series, and the processing chip 2 is configured to provide the voltage regulation signal in real time according to a voltage difference between two ends of the first resistor R1. Among them, the resistance value of the first resistor R1 is known, and the current of the path where the first resistor R1 and the light-emitting unit L are located can be obtained through the voltage difference between the two ends of the first resistor R1 and the resistance value of the first resistor R1, so that the driving voltage of the light-emitting unit L can be compensated according to the real-time driving current of the light-emitting unit L. As shown in FIG. 2, the anode of the light-emitting unit L may be connected to the first resistor R1, and the cathode of the light-emitting unit L may be connected to the ground end GND. It should be understood that, in other example embodiments, the cathode of the light-emitting unit L may also be connected to other signal ends of a low level.

As shown in FIG. 2, the driving circuit may further include a differential amplification circuit 5. Two input ends of the differential amplification circuit 5 are respectively connected to the two ends of the first resistor R1, the output end of the differential amplification circuit 5 is connected to the processing chip 2, and the processing chip 2 is configured to provide the voltage regulation signal according to the voltage of the output end of the differential amplification circuit 5.

As shown in FIG. 2, the differential amplification circuit 5 may include an operational amplifier OP, a second resistor R2, a third resistor R3, a fourth resistor R4, a fifth resistor R5, and a sixth resistor R6. The output end of the operational amplifier OP is connected to the processing chip 2. The second resistor R2 is connected between a first end of the first resistor R1 and the positive input end of the operational amplifier OP. The third resistor R3 is connected between a second end of the first resistor R1 and the inverting input end of the operational amplifier OP. The fourth resistor R4 is connected between the positive input end of the operational amplifier OP and the ground end. The fifth resistor R5 is connected between the inverting input end of the operational amplifier OP and the output end of the operational amplifier OP. The sixth resistor R6 is connected between the ground end and the output end of the operational amplifier OP. The amplification factor of the differential amplification circuit 5 on the voltage across the two ends of the first resistor R1 may be regulated by regulating the resistance values of the second resistor R2, the third resistor R3, the fourth resistor R4 and the fifth resistor R5. The sixth resistor R6 may be used to reduce the current input to the processing chip 2.

In some embodiments, amplify the voltage difference between the two ends of the first resistor R1 may be amplified by the differential amplification circuit 5. On one hand, such setting may enable the voltage output by the differential amplification circuit 5 to be within the test precision of the processing chip 2; and on the other hand, such setting may enable the first resistor to be designed with a small resistance value, thereby reducing the divisional voltage and power consumption of the first resistor. Among the, the processing chip 2 may include an analog-to-digital converter, the analog-to-digital converter may convert the voltage output by the differential amplification circuit 5 into a digital signal, and the processing chip 2 may be configured to provide the voltage regulation signal by using a preset algorithm. The preset algorithm may include comparing the magnitude of the reference voltage (a digital signal) with the magnitude of the voltage (a digital signal) of the output end of the differential amplification circuit 5 under the turned-on state of the light-emitting unit, where, when the voltage of the output end of the differential amplification circuit 5 is greater than the reference voltage, the voltage regulation signal is used to reduce the driving voltage of the light-emitting unit, and when the voltage of the output end of the differential amplification circuit 5 is less than the reference voltage, the voltage regulation signal is used to increase the driving voltage of the light-emitting unit. The control method may be repeated until the voltage of the output end of the differential amplification circuit 5 is equal to the reference voltage. In this case, the driving voltage of the light-emitting unit L may be maintained by the voltage regulation circuit 1. Among them, the reference voltage is a preset voltage, and the reference voltage is the voltage of the output end of the differential amplification circuit 5 when the driving current of the light-emitting unit L is a reference current. The reference voltage may be obtained according to the reference current and the resistance value of the first resistor. The preset reference current may be set according to factors such as the light-emitting efficiency and the aging state of a reference light-emitting unit with a target brightness.

It should be noted that, in other example embodiments, it may also be allowed that there is a slight error between the regulated driving current and the reference current in the driving circuit. Correspondingly, when the difference between the voltage of the output end of the differential amplification circuit 5 and the reference voltage is less than the preset value, regulation of the driving voltage of the light-emitting unit may be stopped.

It should be understood that, in other example embodiments, the voltage across the two ends of the first resistor R1 may not be amplified by the differential amplification circuit 5. For example, the voltage of the output end of the differential amplification circuit 5 may be equal to the voltage across the two ends of first resistor R1.

In some embodiments, the processing chip may provide the voltage regulation signal through a Proportional Integral Derivative (PID) control algorithm. For example, the preset algorithm may include obtaining the total voltage required across two sides of the light-emitting unit and the first resistor according to a formula of $Vd=Vc*R1*I/V1$ under the turned-on state of the light-emitting unit, where R1 is the resistance value of the first resistor, V1 is the voltage difference between the two ends of the first resistor, Vc is the total voltage across the two sides of the light-emitting unit and the first resistor before the driving voltage of the light-emitting unit is regulated, Vd is the total voltage required across two sides of the light-emitting unit and the first resistor, and I is the reference current. The processing chip 2 may obtain the corresponding voltage regulation signal according to the total voltage required across two sides of the light-emitting unit and the first resistor, and the serial-to-parallel chip 3 may be configured to provide Vc and Vd.

In other example embodiments, the processing chip 2 may further regulate the driving voltage of the light-emitting unit in other manners. For example, the processing chip 2 may regulate the driving voltage of the light-emitting unit according to a preset step size by using the voltage regulation signal, and the step size for each regulation of the driving voltage of the light-emitting unit is the same. For another example, the processing chip 2 may regulate the driving voltage of the light-emitting unit according to a preset step size by using the voltage regulation signal, and the smaller the difference between the voltage of the output end of the differential amplification circuit 5 and the reference voltage is, the smaller the step size for regulation of the driving voltage of the light-emitting unit is, where such setting may improve the precision and speed of voltage regulation.

In some embodiments, a logic signal "1" or a logic signal "0" may be output at the output end of the serial-to-parallel chip 3. When a logic signal "1" is output at the output end of the serial-to-parallel chip 3, the voltage of the output end of the serial-to-parallel chip 3 may cause the light-emitting unit to be turned on. When a logic signal "0" is output at the output end of the serial-to-parallel chip 3, the voltage of the output end of the serial-to-parallel chip 3 may cause the light-emitting unit to be turned off. A high-frequency logic signal may be output at the output end of the serial-to-parallel chip 3 to realize high-frequency driving of the light-emitting unit. For example, the driving frequency of the light-emitting unit may be 120 Hz. Meanwhile, the brightness of the light-emitting unit may be controlled by controlling the logic signal of the output end of the serial-to-parallel chip 3. For example, in 120 driving periods within 1 second, the serial-to-parallel chip 3 may be controlled to output the logic signal "0" at the output end in part of the driving periods, and output the logic signal "1" at the output end in part of the driving periods, so that the light-emitting brightness is controlled by controlling the light-emitting duration of the light-emitting unit.

In some embodiments, the first resistor R1 may be selected as a resistor with a relatively smaller temperature drift coefficient to reduce the influence of the temperature on the resistance value of the first resistor. The temperature drift coefficient of the first resistor R1 may be less than or equal to 5000 ppm. For example, the temperature drift coefficient of the first resistor R1 may be equal to 5 ppm, 200 ppm, 1000 ppm, 3000 ppm, 5000 ppm, etc. The resistance value of the first resistor may be set to a smaller value, so that the first resistor has a relatively greater voltage and power consumption. At 25° C., the resistance value of the first resistor R1 is R1, the resistance of the light-emitting unit under the turned-on state is RL, and R1 is less than or equal to ⅕ RL. For example, R1 may be equal to ⅕ RL, ⅐ RL, ⅒ RL, 1/15 RL, 1/20 RL, etc.

As shown in FIG. 2, in some embodiments, the serial-to-parallel chip 3 includes a plurality of output ends Out, and each of the plurality of output ends of the serial-to-parallel chip 3 may be connected to a light-emitting unit L, where not all light-emitting units are shown in the figure. The voltages of the logic signals "1" output by the serial-to-parallel chip 3 at all output ends may be the same, and the voltages of the logic signals “0” output by the serial-to-parallel chip 3 at all output ends may also be the same. In some embodiments, the first resistor R1 may be provided only in the current path where one output end of the serial-to-parallel chip 3 is located. The light-emitting units connected to all output ends of the serial-to-parallel chip 3 have the same temperature environment, and it may be approximately considered that the internal resistances of the light-emitting units connected to all output ends of the serial-to-parallel chip 3 are the same. Therefore, the driving voltages of all the light-emitting units may be regulated through the voltage across two sides of one first resistor.

Figure 3:
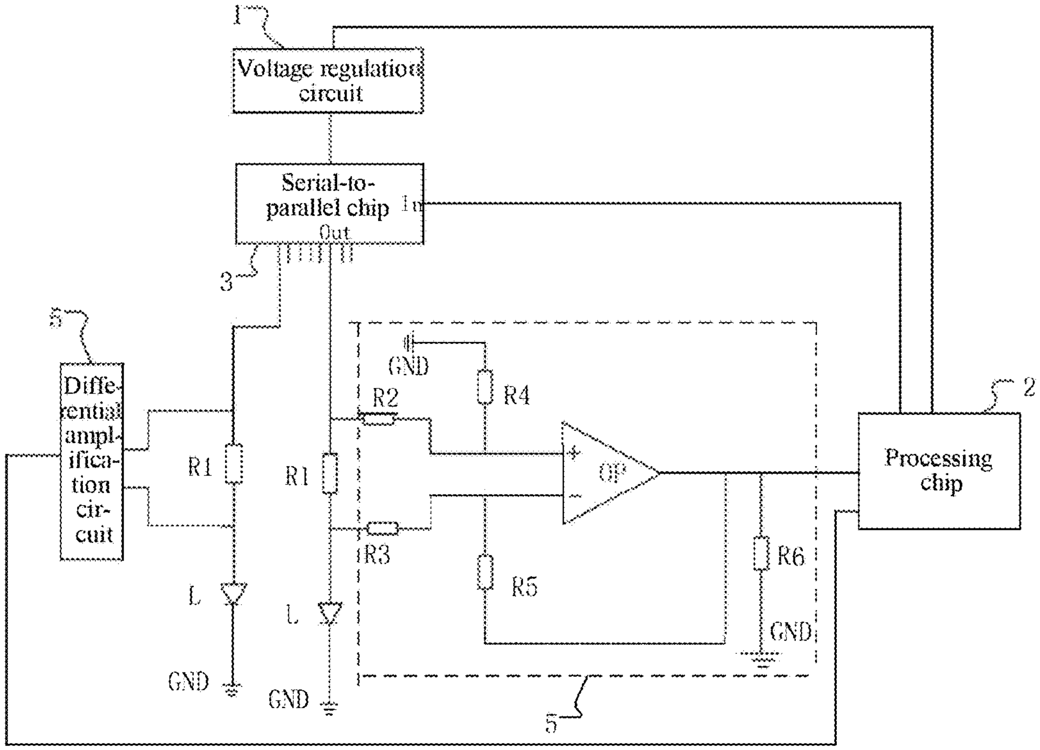
FIG. 3 is a schematic structural diagram of a driving circuit according to some embodiments of the present disclosure.

FIG. 3 is a schematic structural diagram of a driving circuit according to some embodiments of the present disclosure. The driving circuit may also include a plurality of first resistors R1, a first resistor R1 and a light-emitting unit are provided correspondingly, and the first resistor R1 and the light-emitting unit corresponding to the first resistor R1 are provided in series. Correspondingly, the driving circuit further needs to be provided with a plurality of differential amplification circuits in one-to-one correspondence with the first resistors. The processing chip 2 may be configured to provide the voltage regulation signal in real time according to the voltage differences between two ends of the plurality of first resistors R1. For example, the processing chip 2 may be configured to provide the voltage regulation signal according to an average value or a median value of the voltage differences between two ends of the plurality of first resistors R1. This arrangement may improve the problem of great brightness difference between different light-emitting units caused by inconsistent resistances of different light-emitting units. Among them, the manner for the processing chip 2 to obtain the voltage regulation signal according to the voltage difference may be the same as that in the foregoing embodiments.

It should be noted that the driving circuit shown in FIG. 3 is only provided with the first resistors on the paths where the two output ends are located, and it should be understood that, in other example embodiments, any one of the output ends of the serial-to-parallel chip 3 may be connected to a first resistor.

Figure 4:
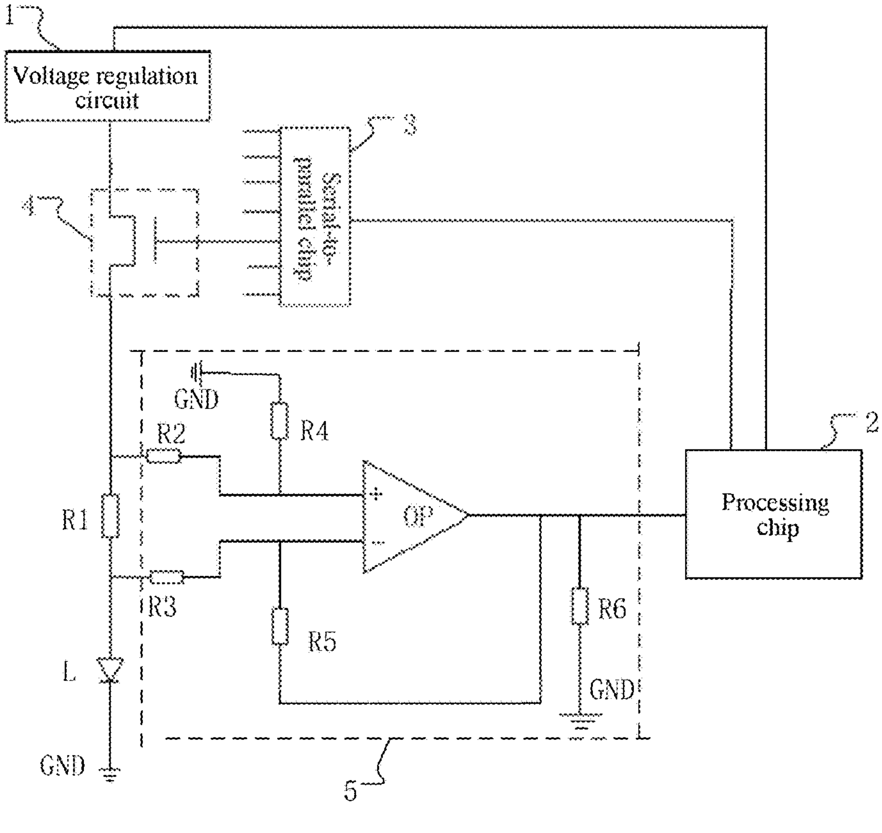
FIG. 4 is a schematic structural diagram of a driving circuit according to some embodiments of the present disclosure.

In some embodiments, the present disclosure further provides another driving circuit, as shown in FIG. 4, which is a schematic structural diagram of a driving circuit according to some embodiments of the present disclosure. The driving circuit differs from the driving circuit shown in FIG. 2 in that the driving circuit further includes a plurality of switching units 4. A switching unit 4 and a light-emitting unit L are provided correspondingly, and the switching unit 4 and the light-emitting unit L corresponding to the switching unit 4 are provided in series, where an output end of the serial-to-parallel chip 3 is provided corresponding to the switching unit 4, the output end of the serial-to-parallel chip 3 is connected to a control end of the corresponding switching unit 4, and the parallel data output at the output end of the serial-to-parallel chip 3 is used for controlling the current loop where the light-emitting unit L is located to be turned off or turned on. The driving circuit directly provides the driving voltage to the light-emitting unit L through the voltage regulation circuit 1, thus obtaining the technical effect that the driving voltage of the light-emitting unit is not limited. The switching unit 4 may be an N-type transistor. A logic signal “1” or a logic signal “0” is output at the output end of the serial-to-parallel chip 3. When a logic signal “1” is output by the serial-to-parallel chip 3, the switching unit 4 is turned on, and the light-emitting unit is turned on. When a logic signal “0” is output by the serial-to-parallel chip 3, the switching unit 4 is turned off, and the light-emitting unit is turned off. It should be understood that, in other example embodiments, the switching unit 4 may also be a P-type transistor.

In some embodiments, the processing chip 2 may also control the output voltage of the voltage regulation circuit 1 according to the voltage of the output end of the differential amplification circuit 5. The manner for the processing chip 2 to control the output voltage of the voltage regulation circuit 1 may be the same as that in the foregoing embodiments.

In some embodiments, a power supply signal may be provided to the serial-to-parallel chip 3 through a stable voltage source. It should be understood that, in other example embodiments, the power supply signal may also be provided to the serial-to-parallel chip 3 through an adjustable voltage source. In view of the drift of the threshold voltage of the transistor in the switching unit with temperature or other factors, the adjustable voltage source may input a compensated control voltage to the gate of the transistor according to the threshold drift condition of the transistor, so as to ensure that the transistor is normally turned on or turned off. The adjustable voltage source may have a same structure as the voltage regulation circuit, and may be controlled by the processing chip 2. The adjustable voltage source may also share a voltage regulation circuit. In addition, it should be noted that each output end of the serial-to-parallel chip may be connected to a light-emitting unit, and only one light-emitting unit is exemplarily shown in FIG. 4.

Figure 5:
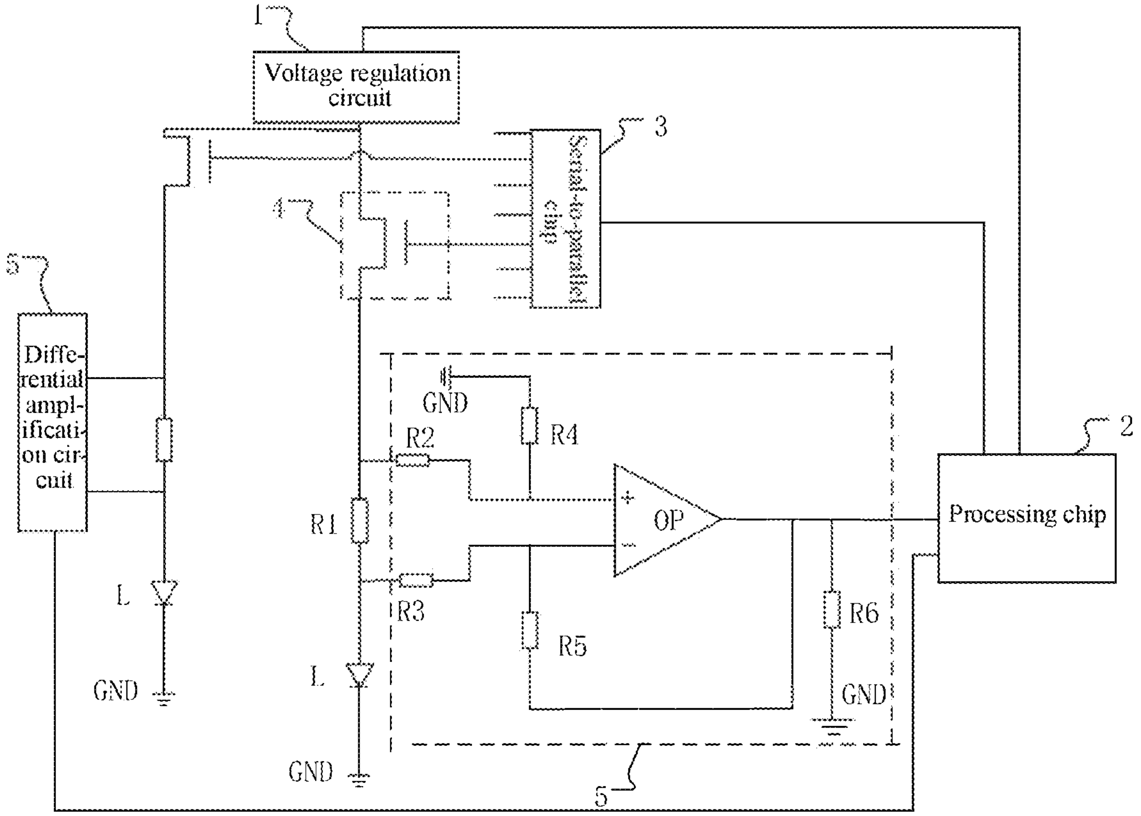
FIG. 5 is a schematic structural diagram of a driving circuit according to some embodiments of the present disclosure.

It should be understood that, in other example embodiments, as shown in FIG. 5, which is a schematic structural diagram of a driving circuit according to some embodiments of the present disclosure, the driving circuit also includes a plurality of first resistors R1, a first resistor R1 and a light-emitting unit are correspondingly provided, and the first resistor R1 and the light-emitting unit corresponding to the first resistor R1 are provided in series. Correspondingly, the driving circuit also needs to be provided with a plurality of differential amplification circuits in one-to-one correspondence with the first resistors. The processing chip 2 may be configured to provide the voltage regulation signal in real time according to voltage differences between two ends of the plurality of first resistors R1. For example, the processing chip 2 may be configured to provide the voltage regulation signal according to an average value or a median value of the voltage differences between two ends of the plurality of first resistors R1. This arrangement may improve the problem of great brightness difference between different light-emitting units caused by inconsistent resistances of different light-emitting units. Among them, the manner for the processing chip 2 to obtain the voltage regulation signal according to the voltage difference may be the same as that in the foregoing embodiments.

In some embodiments, the driving circuit may at least include two light-emitting units, the switching unit 4 connected to one of the light-emitting units L is an N-type transistor, the switching unit 4 connected to the other light-emitting unit L is a P-type transistor, and the two light-emitting units emit light in turn. The control end of the N-type transistor is connected to the output end of the serial-to-parallel chip 3, a logic signal “1” is output at the output end of the serial-to-parallel chip 3, and when the serial-to-parallel chip 3 outputs a logic signal “1”, the switching unit 4 is turned on, the light-emitting unit is turned on. The control end of the P-type transistor is connected to the output end of the serial-to-parallel chip 3, a logic signal "0" is output at the output end of the serial-to-parallel chip 3, and when the serial-to-parallel chip 3 outputs a logic signal "0", the switching unit 4 is turned on, and the light-emitting unit is turned on.

In some embodiments, the driving circuit may at least include two light-emitting units, the two light-emitting units emit light in turn and have different light-emitting frequencies. The switching unit 4 connected to one light-emitting unit L is an N-type transistor, the control end of the transistor is connected to the output end of the serial-to-parallel circuit, which may output a high-frequency logic signal. For example, the frequency of the output end of the serial-to-parallel chip 3 is 120 Hz, and a logic signal "1" is output at the output end of the serial-to-parallel chip 3. When the serial-to-parallel chip 3 outputs a logic signal "1", the switching unit 4 is turned on, the light-emitting unit is turned on, and high-frequency driving of the light-emitting unit may also be realized. The switching unit 4 connected to the other light-emitting unit 1 is a P-type transistor, the control end of the P-type transistor is connected to the output end of the serial-to-parallel chip 3, which may output a logic signal "0". When the serial-to-parallel chip 3 outputs a logic signal "0", the switching unit 4 is turned on, and the light-emitting unit is turned on. The control end of the P-type transistor is connected to the output end of the serial-to-parallel chip 3, which may output a low-frequency logic signal; for example, the frequency of the output end of the serial-to-parallel chip 3 is 50 Hz.

Figure 6:
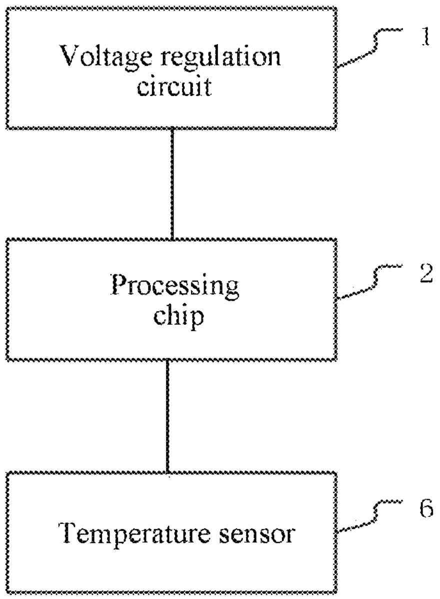
FIG. 6 is a schematic structural diagram of a driving circuit according to some embodiments of the present disclosure.

FIG. 6 is a schematic structural diagram of a driving circuit according to some embodiments of the present disclosure. In some embodiments, the driving circuit further includes a temperature sensor 6. The temperature sensor 6 is configured to detect a temperature of the light-emitting unit, and the processing chip 2 may be configured to provide the voltage regulation signal according to the temperature of the light-emitting unit. Among them, the temperature sensor may be integrated into the processing chip, or may be integrated with the light-emitting unit. The temperature sensor may only include a thermistor, and the processing chip may directly obtain the temperature value according to resistance changes at two ends of the thermistor. Of course, the temperature sensor may also be a finished temperature sensor, and the temperature sensor may directly generate temperature information to the processing chip.

In some embodiments, the internal resistance of the light-emitting unit L in the light-emitting state at different temperatures can be obtained in advance, so that the driving voltage when the driving current of the light-emitting unit is the reference current may be calculated according to the internal resistance of the light-emitting unit L. The database including the mapping relationship between the temperature and the driving voltage is pre-stored in the processing chip 2, and the processing chip 2 can regulate the driving voltage of the light-emitting unit according to the temperature in real time.

The present disclosure further provides a vehicle lamp, and the vehicle lamp includes the above-mentioned driving circuit.

Other embodiments of the present disclosure will be apparent to those skilled in the art from consideration of the specification and practice of the disclosure disclosed here. The present application is intended to cover any variations, uses, or adaptations of the present disclosure following the general principles of the present disclosure and including the common general knowledge and conventional technical means in the art not disclosed in the present disclosure. It is intended that the specification and examples may be considered as examples only, with a true scope and spirit of the present disclosure being indicated by the following claims.

The drawings in the present disclosure only relate to structures involved in the present disclosure, and other structures may refer to general designs. In the case of no conflict, the embodiments of the present disclosure and the features in the embodiments may be combined with each other to obtain a new embodiment. Those of ordinary skill in the art should understand that modifications or equivalent replacements can be made to the technical solutions of the present disclosure without departing from the spirit and scope of the technical solutions of the present disclosure, which should be covered in the scope of the claims of the present disclosure.

It should be understood that the present disclosure is not limited to the precise structures that have been described above and shown in the accompanying drawings, and various modifications and changes may be made without departing from the scope of the present disclosure. The scope of the present disclosure is defined only by the appended claims.

What is claimed is:

1. A driving circuit, wherein the driving circuit is configured to drive a plurality of light-emitting units to emit light, and the driving circuit comprises:

a voltage regulation circuit, configured to regulate a driving voltage of a light-emitting unit according to a voltage regulation signal;

a processing chip, configured to provide the voltage regulation signal to the voltage regulation circuit to reduce a difference between a reference current and a driving current of the light-emitting unit under a turned-on state, wherein the processing chip is further configured to output serial data for controlling the plurality of light-emitting units to be turned off or turned on; and a serial-to-parallel chip, comprising an input end and a plurality of output ends, wherein the input end of the serial-to-parallel chip is configured to receive the serial data, and the serial-to-parallel chip is configured to convert the serial data into parallel data and output the parallel data through the plurality of output ends of the serial-to-parallel chip;

wherein, an output end of the serial-to-parallel chip and the light-emitting unit are correspondingly provided, and the parallel data output at the output end of the serial-to-parallel chip is used for controlling a corresponding light-emitting unit to be turned off or turned on;

the output end of the serial-to-parallel chip is configured to provide a driving voltage to a light-emitting unit corresponding to the output end of the serial-to-parallel chip; and the voltage regulation circuit is configured to provide a power supply voltage to the serial-to-parallel chip, and the power supply voltage of the serial-to-parallel chip is positively correlated with a voltage of the output end of the serial-to-parallel chip within a voltage upper limit range output at the output end of the serial-to-parallel chip.

2. The driving circuit according to claim 1, wherein the driving circuit further comprises:

a plurality of switching units, wherein a switching unit and the light-emitting unit are correspondingly provided, and the switching unit and the light-emitting unit corresponding to the switching unit are provided in series;

wherein, the output end of the serial-to-parallel chip is provided corresponding to the switching unit, the output end of the serial-to-parallel chip is connected to a control end of the corresponding switching unit, and the parallel data output at the output end of the serial-to-parallel chip is used for controlling a current loop in which the light-emitting unit is located to be turned off or turned on; and the voltage regulation circuit is configured to provide a driving voltage to the light-emitting unit.

3. The driving circuit according to claim 1, wherein the driving circuit further comprises:

a first resistor, wherein the first resistor and the light-emitting unit are provided in series;

wherein the processing chip is configured to provide the voltage regulation signal according to a voltage difference between two ends of the first resistor.

4. The driving circuit according to claim 3, wherein the driving circuit further comprises:

a differential amplification circuit, wherein two input ends of the differential amplification circuit are respectively connected to the two ends of the first resistor, and an output end of the differential amplification circuit is connected to the processing chip;

wherein the processing chip is configured to provide the voltage regulation signal according to a voltage of the output end of the differential amplification circuit.

5. The driving circuit according to claim 4, wherein the processing chip is configured to provide the voltage regulation signal by using a preset algorithm;

wherein the preset algorithm comprises:

comparing the voltage of the output end of the differential amplification circuit with a reference voltage under the turned-on state of the light-emitting unit;

wherein, in response to the voltage of the output end of the differential amplification circuit being greater than the reference voltage, the voltage regulation signal is used to reduce the driving voltage of the light-emitting unit; and in response to the voltage of the output end of the differential amplification circuit being less than the reference voltage, the voltage regulation signal is used to increase the driving voltage of the light-emitting unit.

6. The driving circuit according to claim 5, wherein the processing chip is configured to regulate the driving voltage of the light-emitting unit according to a preset step size through the voltage regulation signal, and a step size of each regulation of the driving voltage of the light-emitting unit is the same.

7. The driving circuit according to claim 5, wherein the processing chip is configured to regulate the driving voltage of the light-emitting unit according to a preset step size through the voltage regulation signal, and the smaller a difference between the voltage of the output end of the differential amplification circuit and the reference voltage is, the smaller the step size for regulating the driving voltage of the light-emitting unit is.

8. The driving circuit according to claim 3, wherein the processing chip is configured to provide the voltage regulation signal by using a preset algorithm; and the preset algorithm comprises:

obtaining a total voltage required across two sides of the light-emitting unit and the first resistor according to a formula of $Vd=Vc*R1*I/V1$ under the turned-on state of the light-emitting unit;

wherein R1 is a resistance value of the first resistor, V1 is a voltage difference between two ends of the first resistor, Vc is a total voltage across two sides of the light-emitting unit and the first resistor before the driving voltage of the light-emitting unit is regulated, Vd is the total voltage required across two sides of the light-emitting unit and the first resistor, and I is the reference current; and the processing chip is configured to obtain a corresponding voltage regulation signal according to the total voltage required across two sides of the light-emitting unit and the first resistor.

9. The driving circuit according to claim 1, wherein the driving circuit further comprises:

a plurality of first resistors, wherein a first resistor and the light-emitting unit are correspondingly provided, and the first resistor and the light-emitting unit corresponding to the first resistor are provided in series;

wherein the processing chip is configured to provide the voltage regulation signal according to voltage differences between two ends of the plurality of first resistors.

10. The driving circuit according to claim 9, wherein the processing chip is configured to provide the voltage regulation signal according to one of following:

an average value of the voltage differences between two ends of the plurality of first resistors; and a median value of the voltage differences between two ends of the plurality of first resistors.

11. The driving circuit according to claim 3, wherein a temperature drift coefficient of the first resistor is less than or equal to 5000 ppm.

12. The driving circuit according to claim 3, wherein a resistance value of the first resistor at 25° C. is R1, a resistance of the light-emitting unit under the turned-on state is RL, and R1 is less than or equal to ⅕ RL.

13. The driving circuit according to claim 4, wherein the differential amplification circuit comprises:

an operational amplifier, wherein an output end of the operational amplifier is connected to the processing chip;

a second resistor, connected between a first end of the first resistor and a positive input end of the operational amplifier;

a third resistor, connected between a second end of the first resistor and an inverting input end of the operational amplifier;

a fourth resistor, connected between the positive input end of the operational amplifier and a ground end;

a fifth resistor, connected between the inverting input end of the operational amplifier and the output end of the operational amplifier; and a sixth resistor, connected between the ground end and the output end of the operational amplifier.

14. The driving circuit according to claim 1, wherein the driving circuit further comprises:

a temperature sensor, configured to detect a temperature of the light-emitting unit;

wherein the processing chip is configured to provide the voltage regulation signal according to the temperature of the light-emitting unit.

15. The driving circuit according to claim 1, wherein the light- emitting unit is an organic light emitting diode (OLED) light-emitting unit.

16. A driving method for a driving circuit, wherein the driving method is used for driving a driving circuit, the driving circuit is configured to drive a plurality of light-emitting units to emit light, and the driving circuit comprises:

a voltage regulation circuit, configured to regulate a driving voltage of a light-emitting unit according to a voltage regulation signal;

a processing chip, configured to provide the voltage regulation signal to the voltage regulation circuit to reduce a difference between a reference current and a driving current of the light-emitting unit under a turned-on state; wherein the processing chip is further configured to output serial data for controlling the plurality of light-emitting units to be turned off or turned on; and a serial-to-parallel chip, comprising an input end and a plurality of output ends, wherein the input end of the serial-to-parallel chip is configured to receive the serial data, and the serial-to-parallel chip is configured to convert the serial data into parallel data and output the parallel data through the plurality of output ends of the serial-to-parallel chip;

wherein, an output end of the serial-to-parallel chip and the light-emitting unit are correspondingly provided, and the parallel data output at the output end of the serial-to-parallel chip is used for controlling a corresponding light-emitting unit to be turned off or turned on;

the output end of the serial-to-parallel chip is configured to provide a driving voltage to a light-emitting unit corresponding to the output end of the serial-to-parallel chip; and the voltage regulation circuit is configured to provide a power supply voltage to the serial-to-parallel chip, and the power supply voltage of the serial-to-parallel chip is positively correlated with a voltage of the output end of the serial-to-parallel chip within a voltage upper limit range output at the output end of the serial-to-parallel chip, wherein the driving method comprises:

providing the voltage regulation signal to the voltage regulation circuit by using the processing chip; and regulating the driving voltage of the light-emitting unit according to the voltage regulation signal by using the voltage regulation circuit to reduce the difference between the reference current and the driving current of the light-emitting unit under the turned-on state.

17. A vehicle lamp, comprising a plurality of light-emitting units and a driving circuit, wherein the driving circuit is configured to drive the plurality of light-emitting units to emit light, and the driving circuit comprises:

a voltage regulation circuit, configured to regulate a driving voltage of a light-emitting unit according to a voltage regulation signal;

a processing chip, configured to provide the voltage regulation signal to the voltage regulation circuit to reduce a difference between a reference current and a driving current of the light-emitting unit under a turned-on state, wherein the processing chip is further configured to output serial data for controlling the plurality of light-emitting units to be turned off or turned on; and a serial-to-parallel chip, comprising an input end and a plurality of output ends, wherein the input end of the serial-to-parallel chip is configured to receive the serial data, and the serial-to-parallel chip is configured to convert the serial data into parallel data and output the parallel data through the plurality of output ends of the serial-to-parallel chip;

wherein, an output end of the serial-to-parallel chip and the light-emitting unit are correspondingly provided, and the parallel data output at the output end of the serial-to-parallel chip is used for controlling a corresponding light-emitting unit to be turned off or turned on;

the output end of the serial-to-parallel chip is configured to provide a driving voltage to a light-emitting unit corresponding to the output end of the serial-to-parallel chip; and the voltage regulation circuit is configured to provide a power supply voltage to the serial-to-parallel chip, and the power supply voltage of the serial-to-parallel chip is positively correlated with a voltage of the output end of the serial-to-parallel chip within a voltage upper limit range output at the output end of the serial-to-parallel chip.

18. The vehicle lamp according to claim 17, wherein the driving circuit further comprises:

a first resistor, wherein the first resistor and the light-emitting unit are provided in series;

wherein the processing chip is configured to provide the voltage regulation signal according to a voltage difference between two ends of the first resistor.

* * * * *